S. G. Dugdale,
Automatic Gate,
No. 254.
Reissued Jan. 31. 1854.
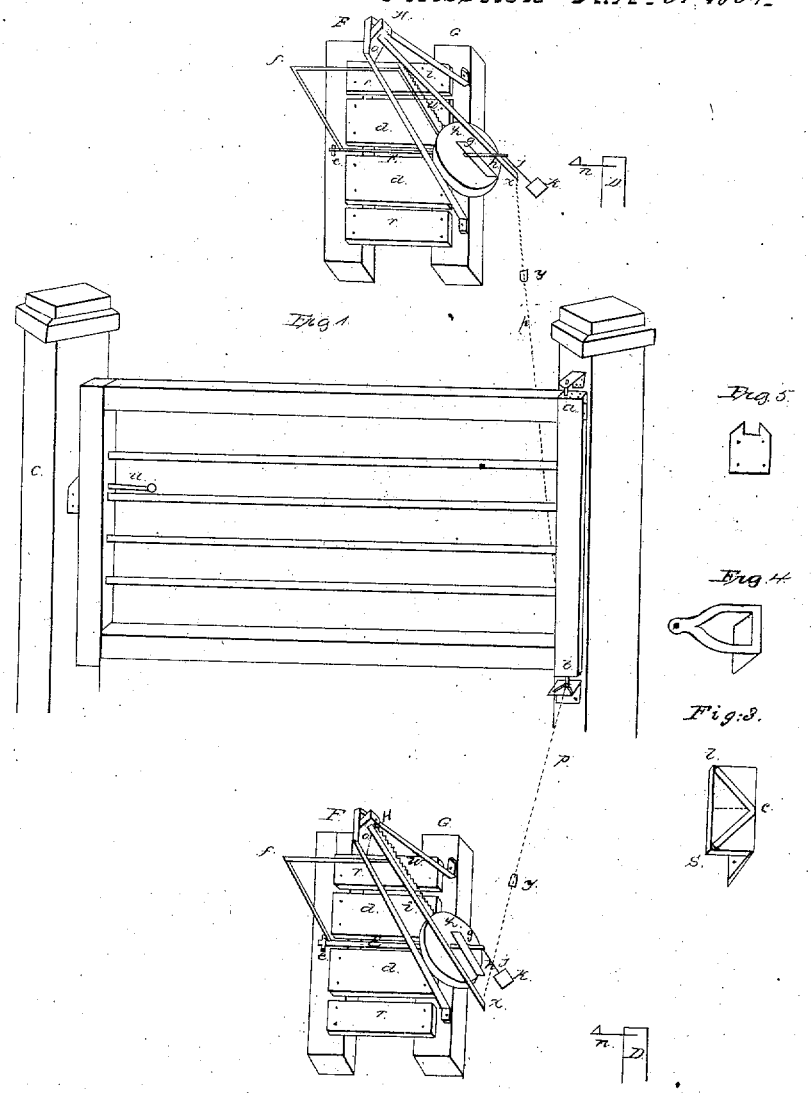
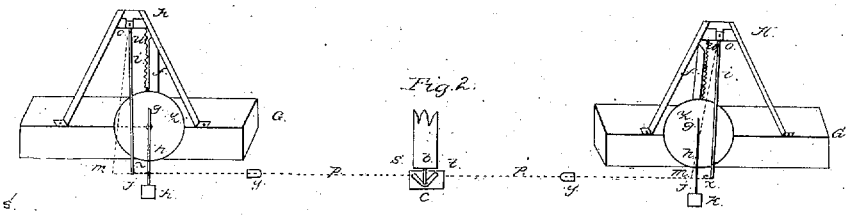
Witnesses.
J. W. Lyons.
John Finley.
Inventor.
Samuel G. Dugdale
N. PETERS, PHOTO-LITHOGRAPHER, WASHINGTON, D. C.

UNITED STATES PATENT OFFICE.

SAMUEL G. DUGDALE, OF RICHMOND, INDIANA.

IMPROVEMENT IN APPARATUS FOR OPENING AND CLOSING GATES.

Specification forming part of Letters Patent No. 10,105, dated October 11, 1853; Reissue No. 257, dated January 31, 1854.

*To all whom it may concern:*

Be it known that I, SAMUEL G. DUGDALE, of the city of Richmond, in the county of Wayne and State of Indiana, have invented a new and useful Improvement in Apparatus for Opening and Closing Gates; and I do hereby declare that the following is a full and exact description of the construction and operation of the same, reference being had to the annexed drawings, making a part of this specification, in which—

Figure 1 is a perspective view; Fig. 2, a transverse section; Figs. 3, 4, and 5, sections.

Like letters refer to like parts.

The gate, Fig. 1, is constructed in the usual form, and balanced by two iron pins, *a* and *b*, upon which it swings. The pin *a* works in a plate, Fig. 4, which is fastened to the post B, Fig. 1. The pin *b* works in a V-groove, *s t c*, Fig. 3, and moves in an oblique direction from and to the post B, Fig. 1. When the gate is shut, it rests in the angle next to the post at *c;* when open it rests at *t* and *s*. The pin *a* is placed out obliquely with the pin *b*, as far as the pin *b* moves in a parallel line with the face of the post when drawn from *c* to *s*, or from *c* to *t*.

Fig. 5 is a representation of the catch on the post C, Fig. 1, which receives the latch *u*. Said catch is constructed in such a manner as will allow the gate to latch from either side, and that when the out end is raised the latch will be free.

*n n* are spring-catches on the posts D D for the purpose of holding the gate when open.

E E, Fig. 1, are shafts of any length. *f f* are vertical levers, made by bending bars of iron in the form of a square and attaching to the shafts E E.

*g g* and *h h* are arms attached to the same shafts, about four inches from the levers *f f*, and parallel with them. The upper arms, *g g*, are half the length of the lower arms, *h h*.

*j j* are arms to which are hung weights *k k* for the purpose of keeping the levers *f f* and arms *g g* and *h h* perpendicular. The shafts E E lie crosswise upon and are secured to the sills F G by caps or staples, as represented at *e*, outside of the levers *f f*.

H H are frames standing upon and secured permanently to the sills G G.

*i i* are pendulous levers, of any length, secured at the top of the frame H at *o*, and hanging fair with the arms *g g* and *h h*. The levers *i i* and arms *g g* and *h h* have a face of from one to two inches acting upon each other.

*d d* and *r r* are cross-pieces spiked to the sills F G, and are so arranged that the levers *f f* will fall below the surface of them, with the top between *d* and *r*.

*p p* are chains or rods of iron, having on one end an eye that slips on the pin *b*, and the other end is hooked to the lever *i* at *x*.

*y y* are swivels in the chains or rods for the purpose of adjusting the levers *i i*.

For convenience springs *w w* and wheels *z z* may be used, substituting pins for the ends of the arms *g g* and *h h*.

The length of the groove, Fig. 3, varies with the dimensions of the gate. If the length of the groove from *c* to *s* or from *c* to *t* is the hypotenuse of two inches, (which is sufficient for a common-size gate,) the pin *b* moves parallel with the face of the post two inches and parallel with the gate two inches. Consequently the pin *a* is set out obliquely with the pin *b* two inches, and the post C is set off from the end of the gate two inches, and if the ends of the levers *i i* are equally distant from the shafts E E the length of the arms *g g* will be one inch and the arms *h h* two inches, and in proportion as the levers *i i* are increased from the shafts downward the length of the arms *g g* and *h h* will be diminished.

The operating machinery is placed a suitable distance from the gate on a line with the post B. The shafts E E, at right angles to and level with the road, and the levers *i i* are hung outside of the arms *g g* and *h h*. The levers *f f* are laid down with the ends of the arms *g g* toward the levers *i i*. The pin *b* resting at *c*, Fig. 3, is then connected with the levers *i i* and the chains or rods tightened until the levers *i i* bear against the ends of the arms *g g*. The levers *f f* are then let to rise and it is ready for operation. On approaching the gate the wheels of the carriage or vehicle pass over the lever *f*, bearing it down to the ground, throwing the long arm *h*, Fig. 2, against the lever *i*, bearing it out to the dotted line *m*, drawing the bottom of the gate out to *s*, and at the same time draws the lever *i* on the opposite side of the gate into the dotted line *m* and against the arm *g*, where it rests until the vehicle has passed through and strikes the opposite lever, *f*. The arm *g* then acts upon the lever *i* in like manner, drawing the levers *i i* and gate back to their place. The gate when to its place hangs plumb and level, and on shifting the bottom in an oblique direction I cause the out end to rise, releasing the latch from the catch, and at the same time lean the gate in the direction I wish it to go, and on opening catches on the posts at the side of the road, it then hangs plumb and level, as when shut, and on drawing it to its place it assumes the same position as when opening and closing, and in like manner whenever the bottom is changed from one bearing to another the same result follows.

Having given a description of the construction and operation of my improvement, I will now show the nature of said improvement, which consists in hanging the gate in such a manner that by moving the bottom in an oblique direction from and to the post B, Fig. 1, I cause the gate to open, close, and fasten by its own weight and assume a plumb and level position both when open and closed, and always opening from the horses. It consists, further, in the arrangement of levers in such a manner that by the vehicle passing over the vertical lever *f* causes the gate to open, and at the same time changes the opposite lever, *i*, so that the vehicle passing over the opposite lever, *f*, closes the gate and draws the levers *i i* to their original position. It will be noticed, also, that a gate arranged upon this plan may be opened and closed, the same as any other swinging gate now in use, without operating the machinery.

What I claim as my invention, and wish to secure by Letters Patent, is—

1. Opening, closing, fastening, and unfastening the gate by moving the bottom of the gate in an oblique direction from and to the post upon which it is hung, as above specified.

2. The use of the pendulous and vertical levers *f f* and *i i* and arms *g g* and *h h*, in combination with the hinges of the gate, the whole being operated and arranged substantially in the manner and for the purpose as above set forth.

SAMUEL G. DUGDALE.

Witnesses:
S. W. LYNDE,
JOHN FINLEY.